United States Patent
Davidson et al.

(10) Patent No.: US 10,877,819 B2
(45) Date of Patent: Dec. 29, 2020

(54) REMINDERS TO CAPTURE IMAGE DATA

(71) Applicant: HEWLETT-PACKARD DEVELOPMENT COMPANY, L.P., Houston, TX (US)

(72) Inventors: Leah Noble Davidson, Portland, OR (US); David R. Parry, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 85 days.

(21) Appl. No.: 16/212,675

(22) Filed: Dec. 6, 2018

(65) Prior Publication Data

US 2020/0183763 A1 Jun. 11, 2020

(51) Int. Cl.
*G06F 9/54* (2006.01)
*G06F 16/25* (2019.01)
*G06F 16/51* (2019.01)
*G06F 16/58* (2019.01)

(52) U.S. Cl.
CPC ............ *G06F 9/542* (2013.01); *G06F 16/252* (2019.01); *G06F 16/51* (2019.01); *G06F 16/5866* (2019.01)

(58) Field of Classification Search
CPC ...... G06F 9/542; G06F 16/51; G06F 16/5866; G06F 16/252
See application file for complete search history.

(56) References Cited

U.S. PATENT DOCUMENTS

| | | | |
|---|---|---|---|
| 7,555,157 B2 | 6/2009 | Davidson et al. | |
| 8,666,142 B2 | 3/2014 | Shkolnik et al. | |
| 9,329,807 B2 | 5/2016 | Hertling | |
| 9,621,823 B2 | 4/2017 | Ramegowda et al. | |
| 9,912,915 B2 | 3/2018 | Sinclair | |
| 9,948,730 B2 | 4/2018 | Rubio | |
| 2011/0052097 A1* | 3/2011 | Sundstrom | G11B 27/034 382/309 |
| 2014/0265047 A1 | 9/2014 | Burris et al. | |
| 2015/0045928 A1 | 2/2015 | Perez et al. | |
| 2016/0110355 A1* | 4/2016 | Charania | G06F 16/58 382/224 |

FOREIGN PATENT DOCUMENTS

WO WO-2017196339 A1 11/2017

OTHER PUBLICATIONS

Luster, "The Original Hashtag Printer", 2011, 16 pages.
Photoflyer, "Photoflyer Share", 2018, 14 pages.
Photopodium SL, "funEvent", 2016, 3 pages.
Pixel-Tech, "Event Print App", 2015, 11 pages.
Smilebooth, "Hashtag Printer", 2014, 4 pages.
Social Playground, "Tap2Print Snapchat Printer", 2017, 5 pages.

* cited by examiner

*Primary Examiner* — Nirav G Patel
(74) *Attorney, Agent, or Firm* — Perry + Currier

(57) ABSTRACT

An example of an apparatus including an input device to receive details about an event is provided. The apparatus further includes a camera to capture image data at the event. The apparatus also includes a memory storage unit to store the image data captured by the camera. In addition, the apparatus includes a reminder generator to generate a plurality of reminders during the event based on the details. Each reminder of the plurality of reminders requests an image from the camera. Furthermore, the apparatus includes a processor to index the image data in a database on the memory storage unit. The database is to be used to generate a gallery about the event.

15 Claims, 5 Drawing Sheets

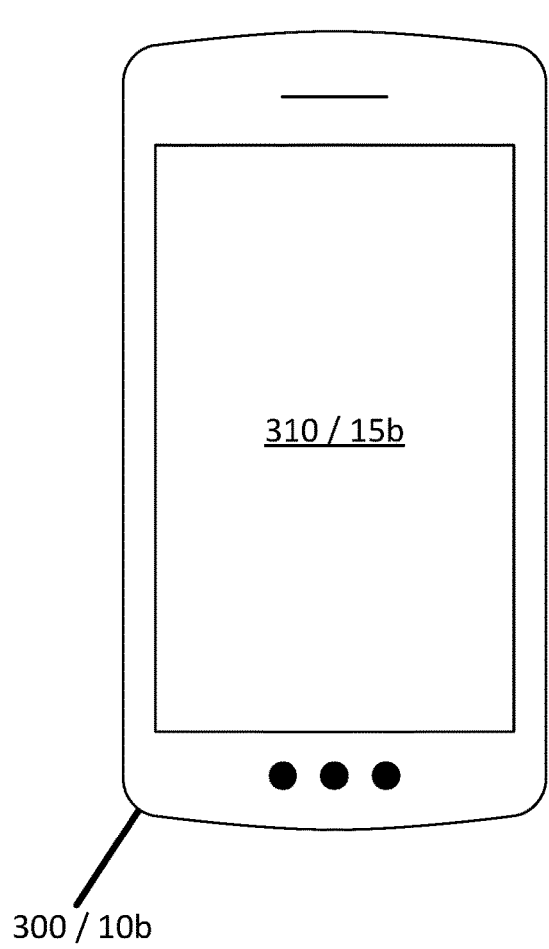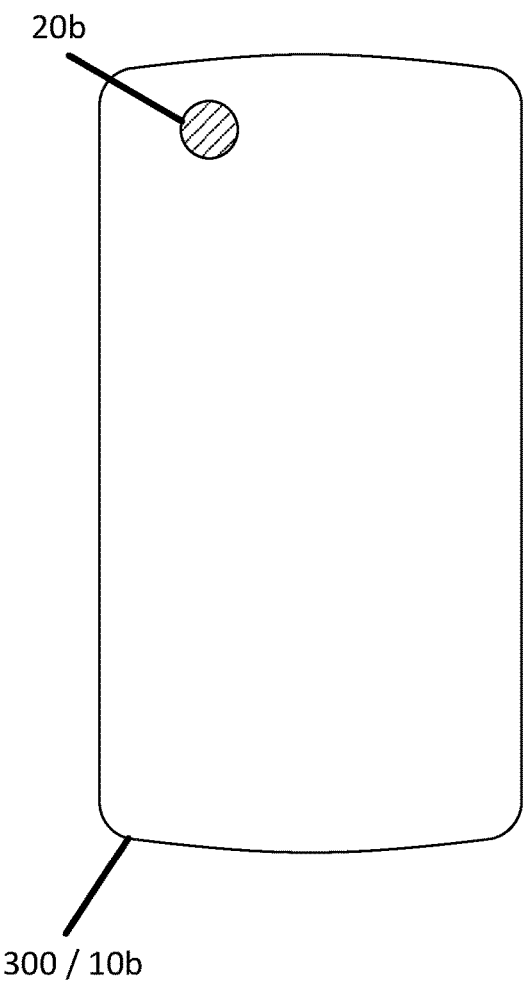
Fig. 5a
Fig. 5b

REMINDERS TO CAPTURE IMAGE DATA

BACKGROUND

Portable electronic devices have become quite popular and many individuals now carry a portable electronic device on their person. Many of these portable electronic devices also have an image capturing component, such as a camera, providing the user the ability to capture images at any location. In addition, sophisticated devices may also include various sensors that may be used to collect information such as location data. The components of the portable electronic devices may also be controlled using a software application installed on the device that may receive input from a user or via a network connection.

BRIEF DESCRIPTION OF THE DRAWINGS

Reference will now be made, by way of example only, to the accompanying drawings in which:

FIG. 5a is a front view of an example of a smartphone implementation of the apparatus of FIG. 4; and FIG. 5b is a back view of an example of a smartphone implementation of the apparatus of FIG. 4.

DETAILED DESCRIPTION

Various apparatus, such as portable electronic devices, may be equipped with cameras to allow users to capture images on demand. With the increase use of portable electronic devices, people now have the ability to capture images that may represent moments as they happen and are constantly able to take photographs at any time. This capability has fueled the growth in various forms of communication such as social media, where people may share images that have been captured using the portable electronic device.

Although some people may be naturally talented at capturing appropriate moments with the camera of a portable electronic device, others may have difficulty capturing appropriate moments or not capturing a sufficient number of images associated with an event. For example, an attendee at a wedding who is talented at capturing moments may take photographs or videos using their portable electronic device, such as a photograph of the cake, the bride, the groom, the centerpieces, the wedding party speeches etc. At the same event, another attendee may take much fewer photographs, or instead take photographs of other moments that are considered to be less photograph worthy, such as photos of friends absent the wedding party. By not capturing appropriate moments from an event, an attendee may lose the opportunity to memorialize the event from the attendee's perspective.

Accordingly, an apparatus and method are provided to facilitate a user of the apparatus, such as a portable electronic device having a camera to capture more significant moments from an event. The apparatus may provide notifications or reminders to the user of the apparatus via normal notifications associated with the apparatus. For example, for an apparatus such as a smartphone, the apparatus may generate sounds, vibrations, or visual indicators. Upon reacting to the indicator, the apparatus may display a reminder to capture an image of a moment at a given event.

Figure 1:
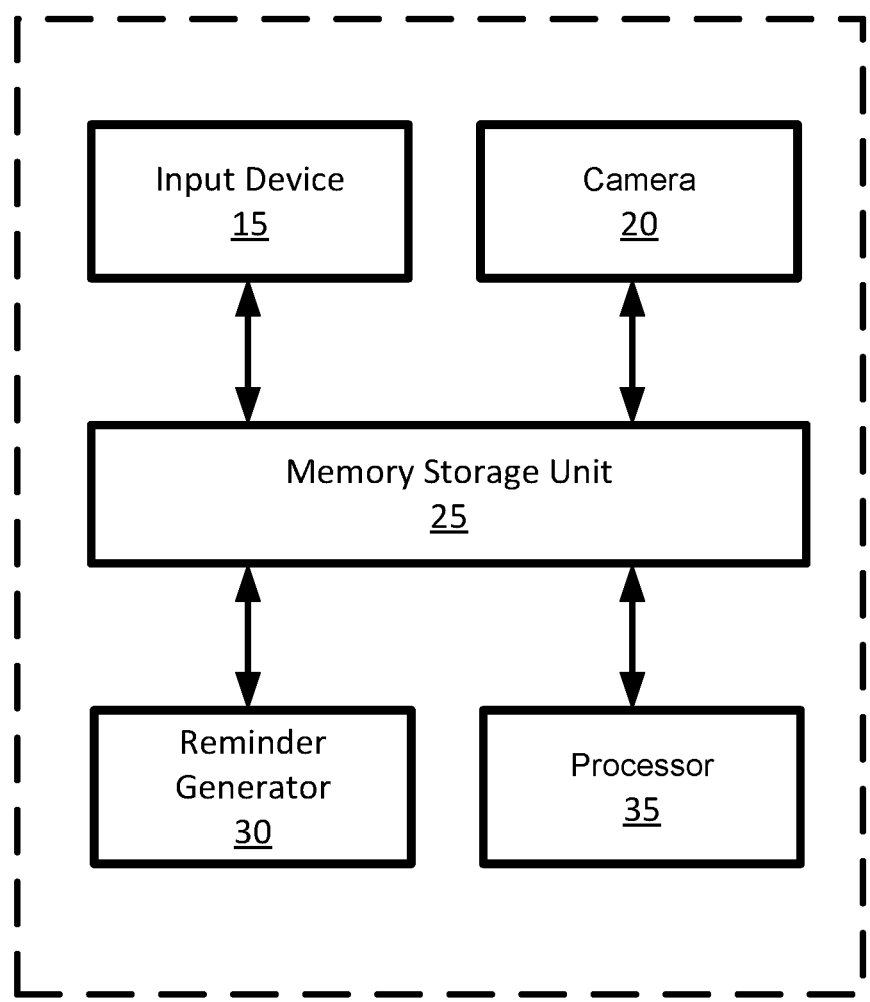
FIG. 1 is a block diagram of an example apparatus to capture images at an event.

Referring to FIG. 1, an example apparatus to capture images at an event is generally shown at 10. The apparatus 10 may include additional components, such as various memory storage units, interfaces to communicate with other computer apparatus or devices, and further input and output devices to interact with the user. In addition, input and output peripherals may be used to train or configure the apparatus 10 as described in greater detail below. In the present example, the apparatus 10 includes an input device 15, a camera 20, a memory storage unit 25, a reminder generator 30, and a processor 35. Although the present example shows the reminder generator 30 and the processor 35 as separate components, in other examples, the reminder generator 30 may be the same physical component as the processor 35, which may carry out multiple functions.

It is to be appreciated that the apparatus 10 is not limited and may be include a wide variety of devices capable of carrying out the functionality described below. For example, the apparatus 10 may be a portable electronic device, such as a tablet computing device, a camera 20, a smartphone, a wearable device, or laptop computer. In particular, the apparatus 10 is to have the capability to provide a reminder to a user as well as the capability to capture image data.

In the present example, the input device 15 is to receive details about an event. The input device 15 is not particularly limited. In the present example, the input device 15 may be a device to receive input from user, such as a keyboard, a pointer device, a touch sensitive device, a button, a microphone, or any other device to generate signals upon activation. For example, in the present example, the input device 15 may be a touch screen disposed on the apparatus 10. In this example, the details of the event may be manually entered In other examples, the input device 15 may be a communications interface to communicate with a connected device or a network, such as the Internet, where the input is received from another electronic device. For example, the apparatus 10 may be connected to another computer, such as a central server, which provides details about an event. In other examples, the apparatus 10 may be connected to another device in closer proximity, such as a smartwatch, another smartphone or another type of wearable device.

The camera 20 is to capture image data at the event. The camera 20 may be connected to the memory storage unit 25. Accordingly, upon capturing the image data, the camera 20 may transfer the data to the memory storage unit 25 for storage. In the present example, the camera 20 is to capture image data from an event and may be designed to operating in such conditions. For example, when the camera may include appropriate sensor and optical components to measure image data over a wide variety of lighting conditions. In some examples, the apparatus 10 may be equipped with multiple cameras where each camera 20 may be designed for slightly different operating conditions.

The memory storage unit 25 may be coupled to other components of the apparatus 10 including the input device 15, the camera 20, the reminder generator 30, and the processor 35. The memory storage unit 25 may include a non-transitory machine-readable storage medium that may be any electronic, magnetic, optical, or other physical storage device. The memory storage unit 25 is to store the image data captured by the camera 20. In addition, the memory storage unit 25 may be used to store instructions or event details received via the input device 15.

In the present example, the memory storage unit 25 may also store an operating system that is executable by the processor 35 to provide general functionality to the apparatus 10, for example, functionality to support various applications. The memory storage unit 25 may additionally store instructions to operate the reminder generator 30 as well as other hardware drivers to communicate with other components and other peripheral devices of the apparatus 10, such as the input device 15 and the camera 20 as well as various other additional output and input devices (not shown).

The reminder generator 30 is to generate a plurality of reminders during an event. The manner by which the reminders are generated are not limited and may vary depending on the event. In the present example, the reminders may be based on the details of the event received via the input device 15. In particular, the details of the event may dictate when the reminders are to be generated and/or what type of reminders are to be generated. Each reminder generated by the reminder generator 30 is to request an image from the camera 20. The manner by which the reminder generator 30 makes the request is not particularly limited. For example, the reminder may involve generating a visual indication on the apparatus via a screen, or other light source. The reminder may also generate a mechanical notification such as a vibration or a physical flag or other change in the physical appearance of the apparatus 10. In further examples, the reminder generator 30 may also cause the apparatus to output sounds which may be a chime, alarm, or voice reminder.

As an example, it may be assumed that the details of an event received indicate that the user of the apparatus 10 is attending a child's birthday party for one hour beginning at that time. The details received via the input device are to indicate a child's birthday party and that the duration is for one hour. Accordingly, the reminder generator 30 may generate six reminders spaced ten minutes apart, where each of the reminders may be associated with a moment. Each of the reminders may be associated with a different request to capture appropriate moments for the event, which in this example is a child's birthday party. For example, the six reminders may include a request for an image of your child with the birthday child, an image of the birthday child alone, an image of your child alone, an image of the birthday cake, a group image of attendees with the cake, and an image of the presents. Each of these reminders may be generated throughout the event to prompt the user of the apparatus 10 capture the described image. It to be appreciated that the timing of the reminders is not limited and in other examples, the reminders may be provided at different time intervals or randomized. Furthermore, the order of the reminders is not particularly limited. In further examples, the reminders may be periodically spaced based on known details of the event or estimated details. For example, the timing of the present opening may be provided in the event details. In other examples, it may be estimated to be fifteen minutes before the end of the event.

As another example, it may be assumed that the details of an event received indicate that the user of the apparatus 10 is attending a wedding reception for hour beginning at that time. The details received via the input device are to indicate a wedding reception and that the duration is for four hours. Accordingly, the reminder generator 30 may generate eight reminders, where each of the reminders may be associated with a moment. Each of the reminders may be associated with a different request to capture an appropriate moment for the event, which in this example is a wedding reception. For example, the eight reminders may include a request for an image of the bride and groom entering, a video of the best man's speech, a video of the maid of honor's speech, an image of a kiss between the bride and groom, an image of the cake, an image of the cake cutting ceremony, a video of the first dance, and an image of the user with the bride and groom. Each of these reminders may be generated throughout the event to prompt the user of the apparatus 10 capture the described image. In this example, the reminders may be generated at the estimated timing of the events if the wedding program were to be entered into the apparatus as event details. In other examples, the apparatus 10 may receive input via a message across a network to indicate the occurrence of these events.

The processor 35 is to index the image data representing images captured during the event and stored on the memory storage unit 25. The processor 35 may then store the indexed image data in a database on the memory storage unit 25 for subsequent use, such as to generate a photo gallery of the event. In the present example, the database of image data may be transmitted to a third-party service for the generation of a photo gallery and/or storybook. In other examples, the processor 35 may generate a gallery and/or a storybook on the apparatus.

In the present example, the processor 35 is not limited and may include a central processing unit (CPU), a graphics processing unit (GPU), a microcontroller, a microprocessor, a processing core, a field-programmable gate array (FPGA), an application-specific integrated circuit (ASIC), or similar. In other examples, the processor 35 may refer to multiple devices or combinations of devices capable of carrying out various functions described in greater detail below.

It is to be appreciated that the manner by which the processor 35 indexes the image data is not limited. For example, the processor 35 may associate image data captured by the camera 20 with a moment. In some examples, the association of the image data captured by the camera 20 with a moment may be a process involving input received from the input device 15. In other examples, the association may be automatically made by the processor 35 based on metadata of the image data collected. The metadata is not particularly limited and may include information such as when the image data was collected as well as the location from which the image data is collected. The location information may be obtained from other components of the apparatus 10, such as a GPS receiver or a Wi-Fi antenna. For example, the image data may be associated with a moment if the image data were to be captured within a predetermined time threshold that the reminder for the moment was generated by the reminder generator 30. It is to be appreciated that the threshold is not particularly limited and may be varied depending on the moment. For example, some moments may provide a longer period of time to capture image data. In some example, the time threshold may be a minute, five minutes, ten minutes or more. The threshold may also depend on the estimated duration of the event as a longer event may provide more leeway in capturing associated image data.

Figure 2:
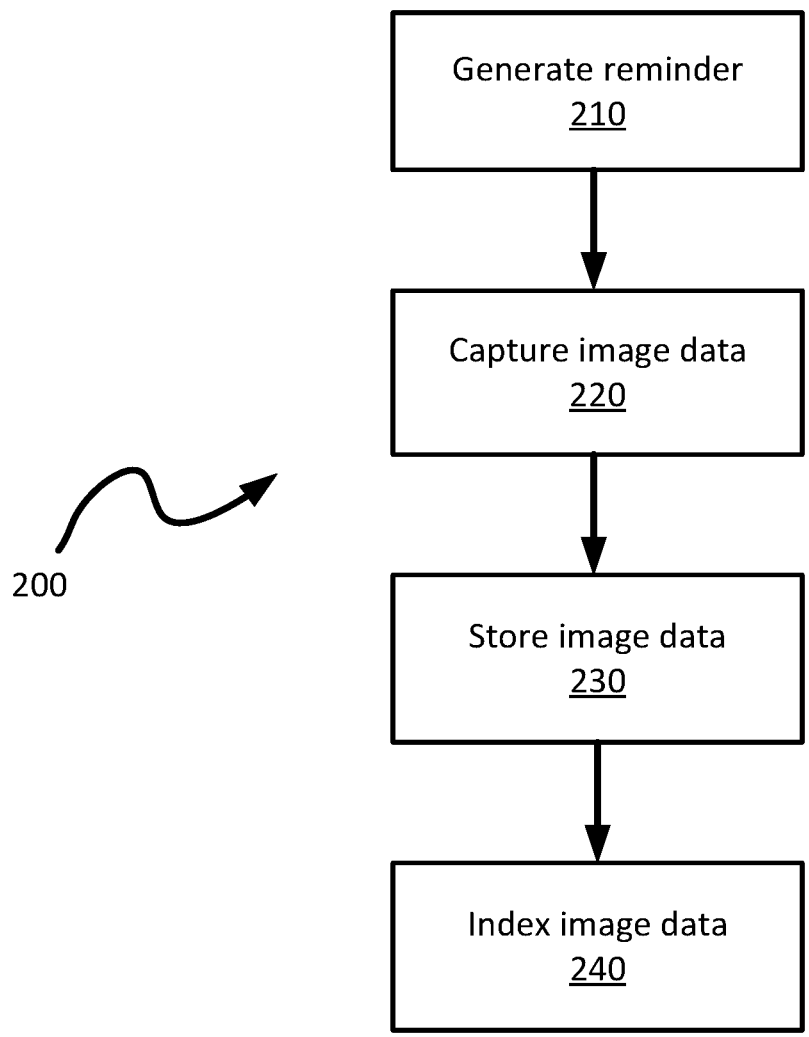
FIG. 2 is a flowchart of an example of a method of capturing images at an event.

Referring to FIG. 2, a flowchart of an example method of capturing images at an event with a portable electronic device is generally shown at 200. In order to assist in the explanation of method 200, it will be assumed that method 200 may be performed with the apparatus 10. Indeed, the method 200 may be one way in which apparatus 10 may be configured. Furthermore, the following discussion of method 200 may lead to a further understanding of the apparatus 10 and its various parts. In addition, it is to be emphasized, that method 200 may not be performed in the exact sequence as shown, and various blocks may be performed in parallel rather than in sequence, or in a different sequence altogether.

Beginning at block 210, a reminder is generated during an event. In the present example, the reminder is generated on a portable electronic device. The reminder is to request a user of the portable electronic device to capture an image using the camera 20. The manner by which the reminder makes the request is not particularly limited. For example, the reminder may involve generating a visual indication on the apparatus via a screen, or other light source. The visual indication may include text or symbols to represent the type of image that is to be captured. The reminder may also generate a mechanical notification such as a vibration or a physical flag or other change in the physical appearance of the portable electronic device, such as by raising a flag. In further examples, the reminder generator 30 may also cause the apparatus to output sounds which may be a chime, alarm, or voice reminder. It is to be appreciated that the reminder may involve a combination of the notifications presented above, such as a visual indication with a vibration.

The generation of a reminder is not particularly limited and each reminder may be associated with a moment at the event. Moments may represent a special time during the event, such as a cake cutting ceremony in some examples. In other examples, moments may refer to a type of image that is to be captured at an event such as a group photo.

Block 220 involves capturing image data with the camera 20 at the event in response to the reminder generated at block 210. The manner by which the image data is captured is not particularly limited. In some examples, the reminder generated at block 210 encourages a user to operate the camera 20 of the portable electronic device to capture image data manually. In other examples, the portable electronic device may include auto capture technology where the camera continuously scans for the moments using image recognition to detect the presence of a moment. In this example, the camera 20 may automatically capture the moment.

Block 230 involves the image data received at block 220 to be stored in the memory storage unit 25. The manner by which the image data is stored is not particularly limited. For example, the image data may be stored in a database of the memory storage unit 25. It is to be appreciated that image data associated with multiple moments in addition to further image data collected by a user without prompting may be received.

In block 240, the processor 35 indexes the image data received at block 220 and stored in the memory storage unit 25 by block 230. It is to be appreciated that the manner by which the image data is indexed is not limited. For example, the processor 35 may associate image data captured by the camera 20 with a moment. In some examples, the association of the image data captured by the camera 20 with a moment may be a process involving input received from the input device 15. In other examples, the association may be automatically made by the processor 35 based on metadata of the image data collected. The metadata is not particularly limited and may include information such as when the image data was collected as well as the location from which the image data is collected. The location information may be obtained from other components of the apparatus 10, such as a GPS receiver or a Wi-Fi antenna. For example, the image data may be associated with a moment if the image data were to be captured within a predetermined time threshold that the reminder for the moment was generated by the reminder generator 30. It is to be appreciated that the threshold is not particularly limited and may be varied depending on the moment. For example, some moments may provide a longer period of time to capture image data. In some example, the time threshold may be a minute, five minutes, ten minutes or more. The threshold may also depend on the estimated duration of the event as a longer event may provide more leeway in capturing associated image data.

In some instances, the image data may not be associated with a moment. Accordingly, the memory storage unit 25 of the present example may also maintain a database to store image data that may not be indexed with a moment, such as if a user takes additional photographs.

In some examples, a photo gallery of the event may be generated by the processor 35 based on the image data stored on the database of the memory storage unit. In the present example, the database of image data may also be transmitted to a central server of a third-party service to be shared with others, such as via social media.

Figure 3:
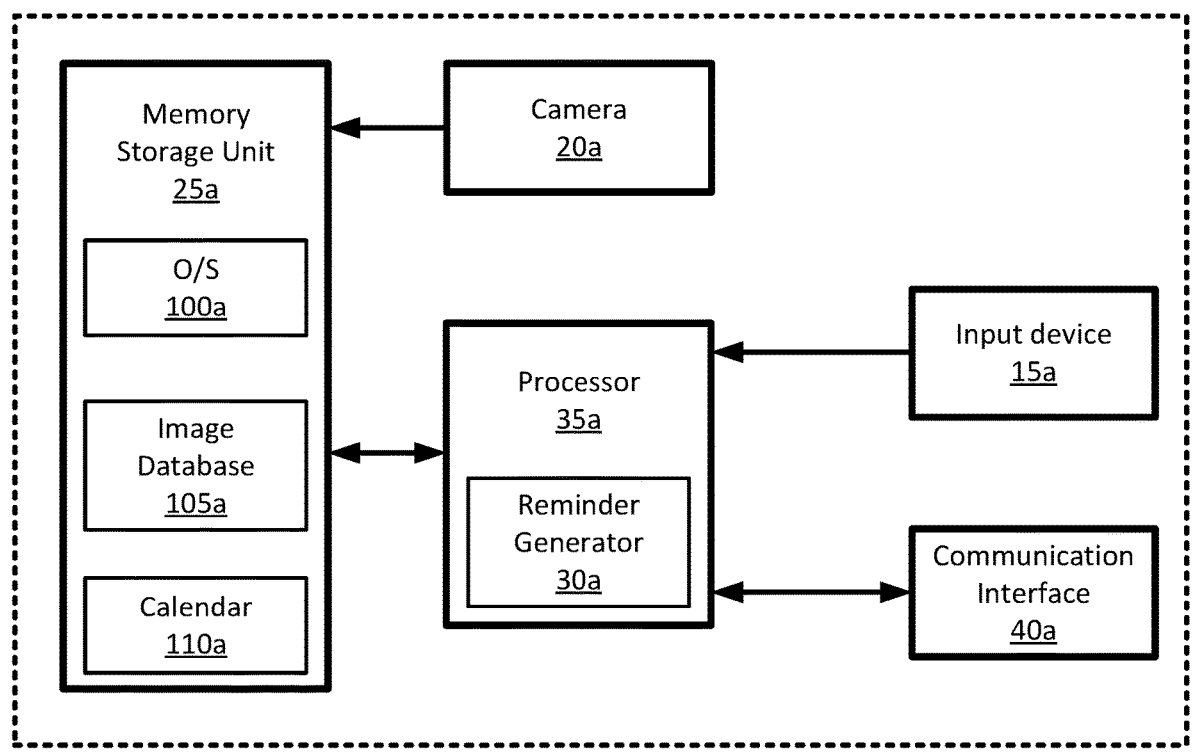
FIG. 3 is a block diagram of another example apparatus to capture images at an event with a calendar feature.

Referring to FIG. 3, another example of an apparatus to capture images at an event is shown at 10a. Like components of the apparatus 10a bear like reference to their counterparts in the apparatus 10, except followed by the suffix "a". The apparatus 10a includes an input device 15a, a camera 20a, a memory storage unit 25a, a reminder generator 30a, a processor 35a, and a communication interface 40a.

In the present example, the memory storage unit 25a includes an operating system 100a that is executable by the processor 35a to provide general functionality to the apparatus 10a, for example, functionality to support various applications. Examples of operating systems include Windows™ MaCOS™ OS™ Android™, Linux™, and Unix™. The memory storage unit 25a may additionally store instructions to operate the reminder generator 30a at the driver level as well as other hardware drivers to communicate with other components and other peripheral devices of the apparatus 10a, such as the communications interface 40a or various output and input devices (not shown).

In the present example, the memory storage unit 25a may also maintain an image database 105a to store image data received from the camera 20a. In the present example, the memory storage unit 25a may receive a plurality of image data to store in the image database 105a where the image data may be subsequently processed or exported to other devices. For example, the apparatus 10a may receive image data associated with multiple photographs captured by the camera 20a for subsequent processing by processor 35a. In addition, once the image data is processed by the processor 35, the memory storage unit 25a may retain the image data in the image database 105a for subsequent use such as to generate a gallery or storybook of an event.

The memory storage unit 25a may also maintain a calendar 110a to store a plurality of events. In this example, it is appreciated that the reminder generator 30a may automatically retrieve details of the event from the calendar 110a for use in generating reminders. In particular, the apparatus 10 may also maintain a clock from which the reminder generator 30a may use to select the event based on the time. In other examples, the reminder generator 30a may use location data to select the event for which the reminders will be based.

The communications interface 40a is to communicate over a network. In the present example, the communications interface 40a is shown as separate from the input device 15a. However, in other examples, the communications interface 40a may be combined with the input device 15a to receive event details, such as from a third-party calendar service. In other examples, the communications interface 40a may also be used to transmit data to other services, such as a publishing service to generate a storybook of an event based on the database of image data.

The manner by which the communications interface 40a receives the data over a network is not limited and may include receiving an electrical signal via a wired connection. For example, the communications interface 40a may be network interface card to connect to the Internet. In other examples, the communications interface 40a may be a wireless interface receive wireless signals such as via a Bluetooth connection, radio signals or infrared signals from other nearby devices.

Figure 4:
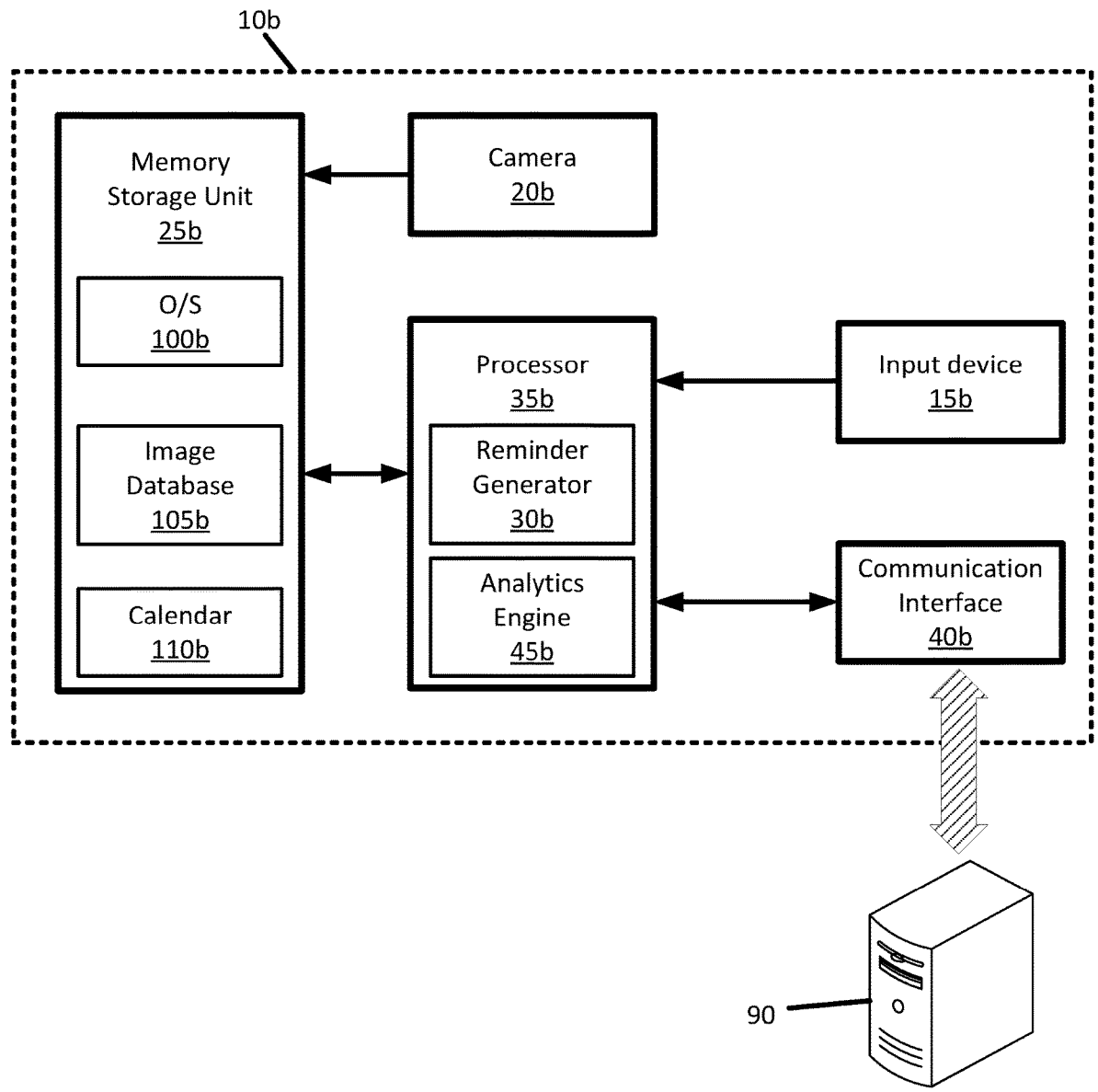
FIG. 4 is a block diagram of another example apparatus to capture images at an event with an analytics engine.

Referring to FIG. 4, another example of an apparatus to capture images at an event is shown at 10b. Like components of the apparatus 10b bear like reference to their counterparts in the apparatus 10a, except followed by the suffix "b". The apparatus 10b includes an input device 15b, a camera 20b, a memory storage unit 25b, a processor 35b running a reminder generator 30b and an analytics engine 45b, and a communication interface 40b.

In this example, the processor 35b further operates an analytics engine 45b to collect and analyze user data. In the present example, the analytics engine 45b may collect a wide variety of data. The data is not particularly limited and may include information in the calendar 110b and the image database 105b. In addition, the analytics engine 45b may collect data associated with a user's response to the reminders generated by the reminder generator 30. For example, the analytics engine 45b may collect data associated with the time it takes a user to follow through with a reminder or whether the user has captured image data associated with the expected moments at the event.

The analytics engine 45b may subsequently transmit the data to server 90. The server 90 is not limited an is to collect data from the analytics engine 45b for marketing purposes. For example, the data may be used to generate targeted advertisements to a user or sold to other parties for use in advertisement. For example, if a user is determined to be a keen photographer, such as each reminder is followed up promptly with an image captured by the camera 20, the server 90 may push advertisements to the apparatus 10 regarding advance photography courses or upgraded equipment. In addition, appropriate events may also be advertised to this user. If the user fails to capture any image data, or if the image data is considered to be of low quality, the server 90 may push beginner courses or other forms of advertisement.

In further examples, the analytics engine 45b may also include some image recognition technology. Therefore, the analytics engine 45b may collect more information from the captured images to carry out photo analysis to determine more information and about a user and develop a profile for targeted advertisements.

In other examples, the apparatus 10b may be a smartphone 300 as shown in FIG. 5. In this example, the apparatus 10b uses a touchscreen 310 as the input device 15b.

It should be recognized that features and aspects of the various examples provided above may be combined into further examples that also fall within the scope of the present disclosure.

What is claimed is:

1. An apparatus comprising:
an input device to receive details about an event, the details including a time duration of the event;
a camera;
a processor; and
a memory storage unit storing instructions that when executed by the processor cause the processor to:
based on the time duration of the event, determine a total number of reminders to be generated at different times during the event;
determine different types of images to be captured by the camera at the different times during the event;
store the reminders in a calendar, wherein each reminder of the reminders requests each type of the different types of the images to be captured by the camera;
generate the reminders at the different times during the event; and
index the images captured by the camera in a database on the memory storage unit, wherein the database is to be used to generate a gallery about the event.

2. The apparatus of claim 1, wherein the calendar is to store schedules of a plurality of events, including the event.

3. The apparatus of claim 2, wherein the instructions are executable to cause the processor to select the event from the plurality of events automatically based on a current time.

4. The apparatus of claim 1, wherein the instructions are executable to cause the processor to associate a reminder from of the reminders with a moment.

5. The apparatus of claim 4, wherein the instructions are executable to cause the processor to associate a first image of the images captured by the camera with the moment.

6. The apparatus of claim 5, wherein the instructions are executable to cause the processor to include metadata of the first image associated with the moment.

7. The apparatus of claim 6, wherein the processor is to use the metadata of the first image to identify the moment associated with the first image.

8. The apparatus of claim 7, wherein the first image is to be associated with the moment if the first image is captured by the camera within a time threshold of the reminder.

9. A method comprising:
receiving details of an event, including a time duration of the event;
based on the time duration of the event, determining a total number of reminders to be generated at different times during the event;
determining different types of images to be captured by a camera of a portable electronic device at the different times during the event;
storing the reminders in a calendar, wherein each reminder of the reminders requests each type of the different types of the images to be captured by the camera;
generating the reminders at the different times during the event on the portable electronic device, wherein each of the reminders requests a specific type of an image to be captured by the camera;
capturing the images by the camera at the event in response to the reminders;
storing the captured images in a memory storage unit; and
indexing the captured images in a database on the memory storage unit.

10. The method of claim 9, further comprising generating a gallery about the event based on the captured images indexed in the database.

11. The method of claim 10, further comprising transmitting the gallery to a central server, wherein the gallery may be is shared with social media.

12. A non-transitory machine-readable storage medium storing instructions executable by a processor to cause the processor to:
- receive details of an event, including a time duration of the event;
- based on the time duration of the event, determine a total number of reminders to be generated at different times during the event;
- determine different types of images to be captured by a camera of a portable electronic device at the different times during the event;
- store the reminders in a calendar, wherein each reminder of the reminders requests each type of the different types of the images to be captured by the camera;
- generate the reminders at the different times during an event, wherein each of the reminders requests a specific type of an image to be captured by the camera;
- capture the images by the camera at the event in response to the reminders;
- store the captured images in a memory storage unit; and
- index the captured images in a database on the memory storage unit.

13. The non-transitory machine-readable storage medium of claim 12, wherein the instructions are executable to cause the processor to associate the captured images with moments based on metadata of the captured images.

14. The non-transitory machine-readable storage medium of claim 13, wherein the instructions are executable to cause the processor to associate the captured images with the moments if the captured images are captured within a time threshold of the reminders.

15. The non-transitory machine-readable storage medium of claim 14, wherein the instructions are executable to cause the processor to select the event from a plurality of events stored in the calendar automatically based on a current time.

* * * * *